United States Patent [19]

Gould

[11] 4,156,067

[45] May 22, 1979

[54] POLYURETHANE POLYMERS CHARACTERIZED BY LACTONE GROUPS AND HYDROXYL GROUPS IN THE POLYMER BACKBONE

[75] Inventor: Francis E. Gould, Princeton, N.J.

[73] Assignee: Tyndale Plains - Hunter Ltd., Princeton, N.J.

[21] Appl. No.: 864,715

[22] Filed: Dec. 27, 1977

Related U.S. Application Data

[63] Continuation-in-part of Ser. No. 809,260, Jun. 23, 1977.

[51] Int. Cl.$^2$ ............................................. C08G 18/34
[52] U.S. Cl. .......................................... 528/73; 8/160; 34/9; 128/130; 128/132 D; 128/156; 128/334 R; 128/334 C; 128/348; 252/522; 424/32; 424/63; 424/65; 424/70; 424/71; 424/76; 424/78
[58] Field of Search ........................ 528/73; 428/425; 128/334 R, 334 C, 348, 130, 132 D, 156; 424/78, 32, 63, DIG. 1, 70, 71, DIG. 7, 65, 76; 8/160; 252/522; 34/9; 351/160

[56] References Cited

U.S. PATENT DOCUMENTS

| | | | |
|---|---|---|---|
| 2,962,524 | 11/1960 | Hostettler et al. | 260/859 R |
| 3,025,269 | 3/1962 | Calfee | 260/77.5 C |
| 3,412,054 | 11/1968 | Milligan et al. | 260/29.2 TN |
| 3,461,103 | 8/1969 | Keberle et al. | 260/859 R |
| 3,993,627 | 11/1976 | Sekmakas et al. | 260/29.2 TN |

*Primary Examiner*—Maurice J. Welsh
*Attorney, Agent, or Firm*—Robert W. Kell

[57] ABSTRACT

Polyurethane polymers characterized by a molecular weight above 6,000 and having lactone groups and hydroxyl groups in the polymer backbone are prepared by reacting a mixture of polyols, a polyfunctional lactone and a polyfunctional isocyanate proportioned so as to provide the desired polymer properties. The product is soluble in alkaline solutions and may be used for light sensitive photographic layers on films, paper or glass; in drug delivery systems, as burn dressings, in body implants such as vascular prosthesis, in molding compositions, and in the manufacture of catheters. The novel polymers also find use in the manufacture of artificial finger nails, finger cots, adhesives, and in protective and hdyrostatic drag resistant coatings. The water absorptivity of the polyurethane lactone polymers is above 10%, preferably in the range of about 20% to 60%, and these polymers may range in their physical properties from rigid solids to completely gel-like high water absorptive polymers. The polymers of the present invention can provide a leachable substrate wherein the leaching agent may be water, gases, alcohols, esters and body fluids, e.g., animal or human.

69 Claims, No Drawings

POLYURETHANE POLYMERS CHARACTERIZED BY LACTONE GROUPS AND HYDROXYL GROUPS IN THE POLYMER BACKBONE

This invention is a continuation in part of my co-pending application Ser. No. 809,260 filed June 23, 1977 and pertains to lactone modified hydrophylic polyurethane resins that are insoluble in water, but which swell in water and other solvents.

More particularly, the present invention relates to polyether urethane resins having active and available lactone groups in the polymer backbone that readily open and dissolve in alkaline solutions to produce carboxylates which can be converted to free carbonyl groups. Typically they are low-melting solids, generally having flow points in the range of 90° C. to 250° C. which can be fabricated by typical polymer procedures.

Numerous polymer systems that contain free carboxylic acid groups are known in the art. It is difficult, however, to prepare a polyurethane that has free carboxylic acid groups for the reason that the isocyanate that is a necessary component in any polyurethane system is quite reactive with carboxylic acid groups.

One approach to the introduction of carboxylic acid groups into a polyurethane resin chain is described in U.S. Pat. No. 3,412,054. In accordance with that method, a 2,2-di(hydroxymethyl) alkanoic acid such as 2,2-di(hydroxymethyl) propionic acid is reacted with an organic diisocyanate to produce a polyurethane containing unreacted carboxylic acid groups.

The polyurethanes of the present invention may be made by the reaction of:

(A) one or more diols having an equivalent weight in the range of from about 100 to 3,000, selected from the group consisting of:
  (a) diethylene glycol,
  (b) long chain polyoxyalkylene diols,
  (c) linear polyester diols derived from the condensation of one or more diols with one or more dibasic acids, and
  (d) the reaction product of one or more alkylene diols with a difunctional linear polyester derived from the condensation of one or more diols with one or more dibasic acids;

(B) a polyfunctional lactone having the formula

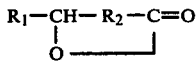

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(-CHOH)$_m$—; m being an integer from 2 to 10; and ethers derived from said lactones; and (C) a urethane precursor selected from the group consisting of organic polyisocyanates and nitrile carbonates.

The long-chain, water-soluble diols should have a molecular weight of at least about 200 and preferably 1450 to 6000 or more and may be derived from ethers, esters and ether-ester block-containing resins. Suitable diols consist predominantly of oxyethylene or oxypropylene groups, though a minor proportion of other oxyalkylene groups may be included. Block copolymer polyols obtained by adding ethylene oxide to a polyoxypropylene chain are also useful as are the linear polyester diols derived from the condensation of one or more diols with one or more dibasic acids, and the reaction product of one or more alkylene diols with a difunctional linear polyester derived from the condensation of one or more diols with one or more dibasic acids.

Representative examples of the polyfunctional lactones are those derived from polysacharides and monosacharides such as mannolactone, delta gluconolactone, sorbolactone and D-glucuronolactone.

It is desirable that the lactones employed have at least 3 and preferably 4 or more hydroxyl groups in the molecule or at least 1 more than is required to form a linear polyurethane chain. These free (unreacted) hydroxyl groups remain in the polymer backbone and are available for cross-linking the polymer. The lactone ring is also reactive and may be opened, i.e., by hydrolysis, to form carboxylate groups or carboxyl groups in the polymer backbone.

The number of carboxylic groups that are present in the polymer chain will be determined by the amount of lactone that is present in the reaction mixture which may be varied from 0.1% to 30% of the weight of the total reaction mixture. Preferably the weight of the lactone will be 0.5% to 15% of the weight of the total reaction mixture.

The polyisocyanate used in the present invention may be represented by R(NCO)$_n$ wherein n is greater than 1, preferably 2–4, and R is an aliphatic, alicyclic, aliphatic-alicyclic, aromatic, or aliphatic-aromatic hydrocarbon compound of from 4 to 26 carbon atoms, but more conventionally from 6 to 20 and generally from 6 to 13 carbon atoms. Representative examples of the above isocyanates are: tetramethylene diisocyanate; hexamethylene diisocyanate; trimethylhexamethylene diisocyanate; dimer acid diisocyanate; isophorone diisocyanate; diethylbenzene diisocyanate; decamethylene 1,10-diisocyanate; cyclohexylene 1,2-diisocyanate and cyclohexylene 1,4-diisocyanate and the aromatic isocyanates such as 2,4- and 2,6-tolylene diisocyanate; 4,4-diphenylmethane diisocyanate; 1,5-naphthalene diisocyanate; dianisidine diisocyanate; tolidine diisocyanate; a polymeric polyisocyanate such as neopentyl tetra isocyanate; m-xylylene diisocyanate; tetrahydronapthalene-1,5 diisocyanate; and bis (4-isocyanatophenyl) methane.

The preferred isocyanate is methylene di(cyclohexyl isocyanate). Other but slightly less preferred diisocyanates are trimethyl hexamethylene diisocyanate and isophorone diisocyanate.

Other compounds which are useful are the isocyanate equivalents which produce the urethane linkages such as the nitrile carbonates, i.e., the adiponitrile carbonate of the formula:

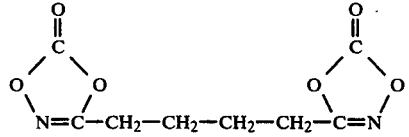

In the manufacture of the polyurethane resins of the present invention, low molecular weight glycols such as diethylene glycol and dipropylene glycol or an aromatic glycol may be added to the reaction mixture. The preferred low molecular weight aromatic polyols are bisphenol A and 4,4'-sulfonyldiphenol.

The proportions in which the long chain polyglycol and the low molecular weight glycol, i.e., diethylene glycol are used depends on the hydrophobic-hydrophilic balance present in each and desired in the final product. Increasing the molecular weight of the long chain polyoxyalkylene glycol and/or the amount of this component contributes strong hydrophilic properties to the final product. This effect may be counter-balanced by increasing the proportion of low molecular weight glycol, i.e., diethylene glycol or dipropylene glycol.

Keeping the above in mind (that it is the number of polyalkylene oxide groups in the polymer molecular that determines hydrophilic properties and the polyethylene oxide groups are more hydrophylic than are polypropylene oxide groups) it is a simple matter to choose mixtures of reactants such that the final product will have the desired properties. By choosing the molecular weight of the polyalkylene glycol or using two polyalkylene glycols of different molecular weight one may "tailor make" products that satisfy a wide range of properties. Amphoteric hydrophilic polyurethane polymers may be made by adding a dialkanol tertiary amine such as diethanol methyl amine to the reaction mixture.

In making the polyurethane resins of this invention the glycols are mixed with the lactone and the polyisocyanate is reacted with the mixture although other techniques may be used. The reaction is catalyzed by known catalyst for such reaction, suitable ones being tin salts and organic tin esters such as dibutyl tin dilaurate, tertiary amines such as triethyl diamine (DABCD), N,N,N',N'-tetramethyl-1,3-butane diamine and other recognized catalysts for urethane reactions which are well known in the art. The reaction can be conducted in the absence or presence of dilutent or solvent.

The polyurethane polyether resins of the present invention because of their unique physical properties may advantageously be used as burn dressings. The resin may be applied to the burn as a powder, film, or from solution in a volatile non-toxic solvent and will form a barrier that is permeable to liquids. Thus the physician has a choice of medicaments which may be applied to the burn prior to the resin coating or may be added to the resin for timed release. A particularly advantageous burn dressing is a powder obtained by the low temperature grinding of from about 1 to about 80 parts by weight of polyvinylpyrolidone-iodine with about 20 to about 99 parts by weight of polyether polyurethane resins having free hydroxyl and carboxylate groups in the polymer backbone.

The above described polyurethane polyether resins are also useful as coatings, molding compounds, absorbents, controlled release agents, ion exchange resins, in the repair of skin abrasions and in the manufacture of dialysis membranes, dentures, cannulae, contact lenses, solubilizing packaging components, hair sprays, cosmetics, burn dressings, contraceptive devices, sutures, surgical implants, blood oxygenators, intrauterine devices, vascular prostheses, oral delivery systems, battery separator plates, eye bandages, dipilatory compositions, corneal prostheses, perfumes, deodorant compositions, antifog coatings, surgical drapes, oxygen exchange membranes, artificial finger nails, finger cots, adhesives, gas permeable membranes, and in protective and drag resistant coatings.

The practice of the invention is further illustrated by the following examples without being restricted thereto, the parts being by weight, unless otherwise stated.

EXAMPLE 1

A diethylene glycol solution of polyethylene glycol is prepared by heating 109.2 parts (0.075 mole) of polyethylene glycol having a molecular weight of 1450 in 17.4 parts (0.164 mole) of diethylene glycol with stirring. The solution is cooled to below 60° C. and to it is added a solution of delta gluconolactone prepared by dissolving 11.6 parts (0.065 mole) of delta gluconolactone in 46.4 parts of dimethyl sulfoxide. Eighty and eight tenths parts (0.316 mole) of methylene bis cyclohexyl-4,4'-isocyanate (a product identified as HYLENE W sold by E. I. DuPont de Nemours & Co., Wilmington, Del.) is added to the mixture with stirring. One half part by weight of an organic tin catalyst solution; dibutyl tin dilaurate (a product identified as $T_{12}$ manufactured by Metal and Thermite Company of Rahway, New Jersey) is added to the reaction mixture with stirring at a temperature below 45° C. to avoid undue temperature rise caused by the heat or reaction. After stirring for 20 minutes, the temperature increases to 80° C. The reaction mixture is then transferred to a tray and placed in an oven at 90° C. for 1 hour to complete the reaction. This polymer, in the wet state, is soft, compliant and flexible.

EXAMPLE 2

A polymer that is insoluble in water but soluble in a mixture of a major portion of alcohol and a minor portion of aqueous base (1.0 N sodium hydroxide) is prepared by the method described in Example 1 from:

| | |
|---|---|
| Polyethylene Glycol (M. Wt. 1450) | 3469 parts (2.37 mole) |
| Diethylene | 254 parts (2.39 mole) |
| Delta Gluconolactone (as a 20% solution in dimethyl sulfoxide) | 116 parts (0.65 mole) |
| HYLENE W | 808 parts (3.16 mole) |
| Dibutyl tin dilaurate | 5 parts |

A piece of this polymer, cast in the form of a cylinder having a volumn of 10 ml. is weighed, immersed in water at room temperature for 12 hours, dried with a paper towel to remove surface moisture and again weighed. The increase in weight was 100%.

EXAMPLE 3

A polymer containing lactone groups that is soluble in a major portion of alcohol having a minor amount of base dissolved therein, or added with a minor amount of water or other carrier is prepared by the method described above in Example 1 from:

| | |
|---|---|
| Polyethylene Glycol (M. Wt. 1450) | 2000 parts (1.37 mole) |
| Diethylene Glycol | 107.5 parts (1.64 mole) |
| Delta Gluconolactone (as a 20% solution in dimethyl sulfoxide) | 116 parts (0.65 mole) |
| HYLENE W | 808 parts (3.16 mole) |
| Stannous Octoate ($T_9$)* | 5 parts |

*$T_9$ is a trademark of the Metal and Thermite Company of Rahway, New Jersey.

EXAMPLE 4

This example illustrates the preparation of a polymer soluble in alkaline solutions using a 5% excess of cyanate groups. The method of preparation is described in Example 1.

| | |
|---|---|
| Polyethylene Glycol (mol. wt. 1450) | 1097 parts (0.75 mole) |
| Diethylene Glycol | 174 parts (1.64 mole) |

| | |
|---|---|
| Delta Gluconolactone (as a 20% solution in dimethyl sulfoxide) | 116 parts (0.65 mole) |
| HYLENE W | 102.4 parts (0.4 mole) |
| Stannous Octoate (T9)* | 5 parts |

*T9 is a trademark of the Metal and Thermite Company of Rahway, New Jersey.

EXAMPLE 5

Fifty grams of the polyurethane polyether resin described above in Example 1 is added to 500 ml of an aqueous solution containing 17.4 ml of 29% ammonium hydroxide. The solution is stirred at 90° C. until all of the polymer dissolves. To the polymer solution is added 10 ml of an aqueous 20% solution of ammonium dichromate [2.0 g $(NH_4)_2Cr_2O_4$]. The solution is applied to cellulose acetate film with a doctor knife and dried at room temperature in subdued light or darkness. A tough film of the photosensitive complex, light yellow in color, is deposited that adheres well to the cellulose acetate substrate. A photographic image is projected onto the film using a S-1 sun lamp as the light source and an exposure time of 60 seconds. The film is developed by washing in water at room temperature to dissolve and remove the unexposed and uncross-linked portion of the photographic image. Since the polymer that forms the photographic image is substantative to ink the developed film may be used in lithography printing processes.

EXAMPLE 6

An anti-fouling marine paint is formulated by grinding in a ball mill for three hours:
Polyurethane resin of Example 2—150 parts
Five percent ammonium hydroxide in ethanol—500 parts
Potassium dichromate—2 parts
Titanium dioxide—50 parts
Mercury acetate—3 parts The product so obtained may be applied to wood and other surfaces to form a film that is cross-linked by sun light to an adherent insoluble protective coating. The product is particularly effective when applied to the hull of a boat as a hydrophylic nature of the urethane resins permits the slow release of the mercury salts and prevents branacle or algae formation on the painted surfaces.

EXAMPLE 7

A polyurethane polyether resin is prepared by the method described in Example 1 above substituting for the polyethylene glycol a block copolymer having a molecular weight of 4750 obtained by adding poly(oxyethylene) groups to a poly(oxypropylene) chain having a molecular weight of 950.
Block copolymer (M. Wt. 4750)—3577 parts
Diethylene glycol—174 parts
Delta gluconolactone (as a 20% solution in dimethyl sulfoxide)—116 parts
HYLENE W—808 parts
Dibutyl tin dilaurate—5 parts

EXAMPLE 8

A polyurethane polyether resin is prepared by the method described in Example 1 above substituting for the polyethylene glycol a block copolymer having a molecular weight of 7500 obtained by adding poly(oxyethylene) groups to a poly(oxypropylene) chain having a molecular weight of 2250.
Block copolymer (M. Wt. 7500)—1157.4 parts
Diethylene Glycol—32.75 parts
Delta gluconolactone (as a 20% solution in dimethyl sulfoxide)—116 parts
HYLENE W—808 parts
Dibutyl tin dilaurate—5 parts

EXAMPLE 9

A polyurethane polyether resin is prepared by the method described in Example 1 above substituting for the polyethylene glycol a block copolymer having a molecular weight of 6500 obtained by adding poly(oxyethylene) groups to a poly(oxypropylene) chain having a molecular weight of 3250.
Block copolymer—325 parts
Diethylene glycol—21.76 parts
Delta gluconolactone (as a 20% solution in dimethyl sulfoxide)—41.41 parts
HYLENE W—132 parts
Dibutyl tin dilaurate—0.5 parts

EXAMPLE 10

A polyurethane polyether resin is prepared by the method described in Example 1 above substituting for the polyethylene glycol a block copolymer having a molecular weight of 13,333 obtained by adding poly(oxyethylene) groups to a poly(oxypropylene) chain having a molecular weight of about 4000.
Block copolymer—1004 parts
Diethylene glycol—17.4 parts
Delta gluconolactone*—11.6 parts
Dimethyl sulfoxide—46.4 parts
HYLENE W—80.8 parts
Dibutyl tin dilaurate—3 parts
*dissolved in dimethyl sulfoxide After stirring for one hour, the reaction mixture is transferred to a tray and placed in an oven at 90° C. overnight.

EXAMPLE 11

A series of three polyurethane polyether resins is prepared by the procedure of Example 1 in which the amount of Delta glucono-lactone is varied.

| Polyethylene glycol (M. Wt. 1450) | Diethylene glycol | Delta gluconolactone* | HYLENE W | Dibutyl tin dilaurate |
|---|---|---|---|---|
| Resin (a) 54.6 g | 8.7 g | 2.9 g | 40.4 g | 0.5 g |
| Resin (b) 54.6 g | 8.7 g | 5.8 g | 40.4 g | 0.5 g |
| Resin (c) 54.6 g | 8.7 g | 11.6 g | 48.5 g | 0.5 g |

*dissolved in dimethyl sulfoxide

After the initial reaction, instead of curing the resin in an oven the three resin (3 g. of each) were mixed with 100 mg of norethandrolone (Nilevar), cast in the form of cylinders 1.3 cm by 2.5 cm and polymerized at 80° C. for 30 hours. After removing from the mold, cylinders suitable for in vivo implantation to provide prolonged release of the norethandrolone (Nilevar) are obtained for use in animal husbandry.

EXAMPLE 12

Delta glucanolactone (14.28 parts) is ground to a fine powder and thoroughly mixed with 29.15 parts of polyethylene glycol (M. Wt. 200). The mixture is heated to 60° C. and to it is added 56.57 parts of HYLENE W and 0.5 parts of stannous octoate with stirring. After the exothermic reaction subsides, the resin is transferred into a tray and placed in an oven at 90° C. for one hour to complete the reaction.

EXAMPLE 13

Polyethylene glycol of molecular weight 1450 (218.4 parts) is mixed with 34.8 parts of diethylene glycol and the mixture is heated with stirring to the melting point. To this melt is added 161.6 parts of HYLENE W.

A solution of delta gluconolactone is prepared by dissolving 23.2 parts of delta gluconolactone in 77 parts of dimethyl sulfoxide. The dleta gluconolactone solution is added to the mixture of glycols and HYLENE W with stirring and the reaction mixture is cooled to 50° C. Eight tenths parts of dibutyl tin dilaurate catalyst is added to the reaction mixture, and stirring is continued until the exothermic reaction subsides. The resin is then cured in an oven at 90° C. for one hour.

The cured resin (2.6 parts) is dissolved in alkaline methanol (7.4 parts) and 2.5 parts of a 2% aqueous ammonium dichromate solution is added. The dichromate catalyzed resin solution is poured through a 5 mm pyrex glass tube 4 feet in length to form a uniform coating on the interior surface thereof. The coating is air dried in ambient light for 5 minutes.

One end of the coated tube is closed with a cork pierced by a fine hypodermic needle. The tube is filled with tap water and then inverted to permit the tap water to drain out. The time required for all water to drain from the tube was 24 seconds. The experiment was repeated ten times. The time required for the tube to drain was always 24±1 seconds.

In a control experiment an uncoated 5 mm pyrex tube 4 feet in length is washed thoroughly with a detergent solution, rinsed with distilled water and air dried. The tube is closed with the same cork pierced by a fine hypodermic needle referred to above and filled with tap water. When this uncoated tube is inverted (10 trials) it required 38±1 seconds for the water to drain from the tube.

The dichromate catalyzed resin composition described above in this example is applied to the hull and center-board of a Lightning Class sailboat and exposed to the sunlight for 6 minutes to cross-link the coating. In a light breeze the sailboat outperforms other boats in her class.

EXAMPLE 14

A diethylene glycol solution of polyethylene glycol is prepared by heating and stirring 249.3 parts (0.172 mole) of polyethylene glycol having a molecular weight of 1450 with 79.5 parts (0.883 mole) of diethylene glycol. To this melt is added 52.9 parts (0.296 mole) of delta gluconolactone, 249.3 parts (0.86 mole) of diethylene glycol adipate and 520 parts (1.85 moles) of methylene bis cyclohexyl-4,4'-isocyanate. The mixture is stirred with heating to form a homogeneous melt and then cooled to 45° C. Two and one tenth parts of a solution of dibutyl tin dilaurate is added to the reaction mixture with rapid stirring to avoid undue temperature rise caused by the heat of reaction. After stirring for twenty minutes, the temperature is 85° C. The reaction mixture is then transferred to a tray and placed in an oven at 90° C. for one hour to complete the reaction. The resulting polymer contains 21 weight percent adipic acid ester, is harder and more rigid than the polymer of Example 1 and is insoluble in water and aqueous alkaline solutions. When immersed in water the increase in weight, due to the water take up, is less than 20 percent.

EXAMPLE 15

A polyurethane polymer derived from a linear polyester diol is prepared by reacting:

| polyethylene glycol | (0.005 mole) | 7.95 parts |
| delta glucanolactone | (0.29 mole) | 5.2 parts |
| diethylene glycol adipate | (0.172 mole) | 49.86 parts |
| HYLENE W | (0.241 mole) | 68.0 parts |

The mixture of reactants is heated with stirring until homogeneous, and 0.24 parts of an organic tin catalyst solution; dibutyl tin dilaurate (a product identified as $T_{12}$ manufactured by Metal and Thermite Company of Rahway, New Jersey) is added to the reaction with stirring at a temperature below 45° C. to avoid undue temperature rise caused by the heat of reaction. After stirring for 20 minutes, the temperature increases to 80° C. The reaction mixture is then transferred to a tray and placed in an oven at 90° C. for 1 hour to complete the reaction. The resulting polymer contains 38 weight percent adipic acid ester and is harder and more rigid than the polymer of Example 14. It is insoluble in basic aqueous solutions and methanol. The water take up of this polymer is less than 15 weight percent.

EXAMPLE 16

Example 15 above is repeated but the amount of the diethylene glycol adipate present in the reaction mixture is reduced from 49.86 parts to 1.15 parts (1.4 weight percent of the reaction mixture). One gram of the polymer of this example when immersed in water swells and absorbs 0.48 g water. One gram of this polymer may be dissolved in a mixture of 9 ml methanol and 1 ml of 2 N aqueous sodium hydroxide.

EXAMPLE 17

To 90 parts by volume of a mixture of ethanol and water (70:30) is added 10 parts of the polymer of Example 1 and 1 part of sulfadiazine. The polymer is dissolved by stirring with the addition of 1 N sodium hydroxide to adjust the pH of the solution to 7.0. The polymer solution may be applied as a burn dressing directly to a burn area and upon evaporation of the solvent forms a protective skin that does not interfere with healing because of its permeability to gases and fluids but prevents the growth of anerobic organisms under the dressing.

EXAMPLE 18

A polymer having the composition set forth in Example 2 above is prepared by heating and stirring the polyethylene glycol, diethylene glycol, delta glucanolactone and HYLENE W to form a homogeneous mixture. The catalyst is added to the reaction mixture at 40° C. and stirring is continued until the exothermic reaction subsides (temperature starts to drop) at which time 232 parts (5 weight percent) or cortisone is added with thorough stirring to assure uniform dispersion. The polymer is cast in the form of cylinders 1.5 cm by 3 cm and is cured at 70° C. After curing, the cylinders are removed from the mold and are suitable for implantation to provide prolonged release of cortisone.

EXAMPLE 19

Fifteen parts of the polymer described in Example 3 above is placed in 70 parts by volumn of a mixture of isopropanol and water (50:50) and 10 parts by volumn of 1 N sodium hydroxide solution is added. The mixture is refluxed to hydrolyse the lactone ring and dissolve the polymer. The solution is titrated to pH 5.0 with 1 N hydrochloric acid and the polymer solids content adjusted to 15 percent with isopropanol. To this polymer solution is added 15,000,000 units of phenoxyethyl penicillin. The resulting solution may be applied to an abraided skin area to seal off the area from irritating physical and biological substances. The deposited film allows the free passage of gases and moisture from the area covered.

EXAMPLE 20

A twenty percent solution of the polymer described in Example 7 above is prepared by dissolving that polymer in a mixture of ethanol and water (50:50) with the addition of sufficient 1 N sodium hydroxide to effect solution. The pH of the solution is adjusted to 6.0 with 1 N hydrochloric acid. The solution so obtained may be applied topically to form a hypoallergenic base for cosmetics. The polymer composition effectively covers skin blemishes and allows the skin to breathe.

EXAMPLE 21

A hair set composition is prepared by dissolving the polyurethane polyether resin of Example 8 above in 95 percent ethanol. Sufficient 1 N sodium hydroxide is added to effect solution and the pH of the final composition adjusted to 7.0. The resulting solution may be applied to the hair in the form of a spray and provides superior holding with a soft feel.

EXAMPLE 22

Twenty parts of the unsaturated polyether resin of Example 1 is dissolved in 80 parts of ethanol-water (70:30) and sufficient 1 N sodium hydroxide to adjust the pH to 9.5. To the solution so obtained is added with stirring 5.6 parts of calcium thioglycolate. The resulting composition finds use as a dipillatory agent.

EXAMPLE 23

The polymer of Example 16 above is extruded to form a tube 1.5 m in length and 10 mm in diameter. Dry nitrogen gas is passed through this tube and into a dry ice trap. The tube is then immersed in a trough of water. Water vapor which is picked up by the nitrogen as it flows through the tube is deposited in the trap as ice.

EXAMPLE 24

A series of three polyurethane polyether resins is prepared in which the amount of Delta glucano-lactone is varied.

| Polyethylene glycol (M. Wt. 1450) | Diethylene glycol | Delta glucono-lactone | HYLENE W | Dibutyl tin dilaurate |
|---|---|---|---|---|
| Resin (a) 54.6 g | 8.7 g | 2.9 g | 40.4 g | 0.04 g |
| Resin (b) 54.6 g | 8.7 g | 5.8 g | 40.4 g | 0.04 g |
| Resin (c) 54.6 g | 8.7 g | 11.6 g | 48.5 g | 0.04 g |

The polyethylene glycol and diethylene glycol are melted and mixed together in the absence of a solvent at 70° C. The Delta glucanolactone and HYLENE W are then added and stirring is continued until the mixture is homogeneous. The mixture is cooled to 45° C. and the dibutyl tin dilaurate is added rapidly with stirring. Stirring is continued for about 15 minutes during which time the exothermic heat of reaction causes the temperature to rise to about 85° C. and the viscosity increases. The polymer is poured while still viscous into a chilling pan and placed in an oven at 75° C. for 20 minutes. The pan is then removed from the oven and cooled to room temperature. The polymer may be removed from the pan and stored indefinitely at room temperature or used immediately as a molding resin. The resin will swell in methanol and may be dissolved in alkaline solutions.

EXAMPLE 25

The resin (a) of Example 24 above is molded in the shape of a lens by placing in a water cooled mold sufficient resin to fill the cavity and applying 15,000 psi pressure at 125° C. The mold is cooled and the optically clear polymer lens is removed.

EXAMPLE 26

One part of norethandrolone (Nilevar) is blended with 30 parts of resin (b) of Example 25 on a Band mill at 40° C. This composition is placed in the cavity of a cylindrical mold and molded at 15,000 psi and 125° C. to form a cylinder of the polyurethane polyester resin having uniformly distributed throughout its mass a pharmacologically effective dosage of norethandrolone.

EXAMPLE 27

An esophageal prosthesis is prepared from a tube woven of polyethylene terphthalate monofilament. The tube is slipped over a cylindrical rod of slightly smaller diameter and the assembly is dipped in a 15% isopropanol solution of the polyurethane polymer of Example 3 prepared as described in Example 19 and air dried. The dipping and drying procedure is repeated until a coating 2 mm in thickness is built up on the external surface of the fabric tube.

A polypropylene monofilament 1.5 mm in diameter is spirally wound around the coated tube with a pitch of 5 turns per centimeter and heat set by placing the assembly in an oven for 15 minutes at 80° C. The supporting rod is then removed from the tube and the tube is repeatedly dipped in the 15% isopropanol solution of polyurethane polymer as described above in the preceding paragraph until the polypropylene monofilament is covered with the polyurethane polymer and the coating of polyurethane polymer on the interior surface of the fabric tube is 2 mm in thickness.

EXAMPLE 28

The polyurethane polymer of Example 3 is dissolved in alkaline ethanol to form a 10 weight percent solution and a pair of polycarbonate safety goggles are dipped in the solution and allowed to dry at room temperature. The coating deposited on the polycarbonate lenses of the safety goggles resulted in a marked improvement in fogging characteristics when compared with a similar pair of safety goggles not so treated.

EXAMPLE 29

A surgical suture is prepared by extruding the resin (b) of Example 24 through an orifice at 110° C. and 15,000 psi. The extruded monofilament is stretched four times, wound on a rack, annealed at 100° C. for one-half hour and cooled to room temperature. The resulting suture may be cut to length, packaged and sterilized by gamma irradiation. If an iodized suture is desired, the suture is immersed in a 10 weight percent solution of iodine in ethanol until the desired amount of iodine has been taken up by the suture. Multifilament sutures may be produced as described above in this example by extruding the polymer of Example 24 (b) through a spinnerette containing the desired number of orifices and braiding the multifilament after it has been annealed.

EXAMPLE 30

The polymer solution described above in Example 17 is cast on a flat glass surface to form a film that is air dried at room temperature. The dry film may be removed from the glass surface and applied directly to the surface of a burn as a burn dressing or the film may be comminuted and applied to the burn in the form of a powder.

EXAMPLE 31

A surgical implant is prepared by blending one part of neo-B-vitamin A with 30 parts of the polyurethane polyether resin of Example 24 (a) on a band mill at 40° C. This composition is placed in the cavity of a cylindrical mold and molded at 15,000 psi and 125° C. to form a cylinder having uniformly distributed throughout its mass an effective dosage of neo-B-vitamin A. In a similar manner surgical implants may be molded containing a pharmacologically effective dosage of a hormone, a drug protagonist, an anti-tubercular drug or a steroid.

EXAMPLE 32

One part of lactic acid is blended with 30 parts of the polyurethane polyether resin (c) of Example 24 on a band mill at 45° C. The composition is placed in the cavity of an annular mold and molded at 15,000 psi and 125° C. to form a polymer ring useful as an intrauterine device.

EXAMPLE 33

The resin (c) of Example 24 is extruded through an annular orifice at 20,000 psi and 135° C. to form a cannula. The cannula is immersed for 24 hours in a 10 weight percent solution of iodine in ethanol after which time the iodine is distributed throughout the resin mass. The cannula is then removed from the iodine solution and air dried.

EXAMPLE 34

A woven tube of textile fibers 3 mm in diameter is repeatedly dipped in the solution of polyurethane polyether resin described in Example 17 and air dried to fill the interstices between the strands with polyurethane polymer and produce a cannula useful in surgery.

Larger diameter tubes of woven polyethylene terphthalate strands may be similarly treated to fill the interstices between the woven strands. The resulting product may be used by the surgeon as a vascular prosthesis.

EXAMPLE 35

A vascular prosthesis is prepared by coating an 8 mm tube of woven collagen strands with the solution of polyurethane polyether resin described in Example 17 and air drying at room temperature to fill the interstices between the strands and coat the interior and exterior walls of the tube. The tube is then dipped in heparin which is absorbed by the polyurethane coating, dried, packaged and sterilized by gamma irradiation.

EXAMPLE 36

A composition effective in the control of dehydration in humans and animals is prepared by grinding together in a ball mill with dry ice 75 parts by weight of the polyurethane polyether resin of Example 10, 5 parts by weight of paregoric, 10 parts by weight bismuth suboxide and 10 parts by weight of psyllium (plantago) seeds. The composition may be administered orally to cattle afflicted with the scours.

EXAMPLE 37

To 98 parts of the polymer solution of Example 20 is added 2 parts by weight of a Red Dye No. 2 and the mixture is ball milled for 2 hours. The resulting composition may be used as a cosmetic.

EXAMPLE 38

A black braided silk suture is passed through the polymer solution of Example 20 wound on a rack and air dried. The resulting suture has an improved hand and tie down properties when compared with black braided silk that has not been so treated.

EXAMPLE 39

The polymer solution described in Example 19 is adjusted to pH 7 and cast on a glass surface to form a film that is air dried. The dry film may be applied directly to the eye as an eye bandage.

EXAMPLE 40

The resin (a) of Example 24 is placed in a press and molded at 15,000 psi and 115° C. to form a battery separator plate.

EXAMPLE 41

To the hair set composition of Example 21 is added 2 weight percent of a perfume essence. When this composition is applied to the hair the solvent rapidly evaporates but the perfume is bound to the polyurethane polymer and is slowly released over a period of 24 hours.

EXAMPLE 42

A household deodorant composition is prepared by mixing 10 parts of phenol with 50 parts of the polymer solution described in Example 20 above, 5 parts of perfume and 35 parts of water.

EXAMPLE 43

A surgical drape is prepared by coating one surface of a woven cotton cloth with the polyurethane polyether solution described in Example 20 above.

EXAMPLE 44

The resin (b) of Example 24 is pressed at 15,000 psi and 110° C. in a hydraulic press to form a polyurethane polyether film having utility as a dialysis membrane. The film so prepared may be advantageously used as the carbon dioxide-oxygen exchange membrane in a blood oxygenator with minimum destruction of blood cells.

EXAMPLE 45

A diethylene glycol solution of polyethylene glycol is prepared by heating 109.2 parts (0.075 mole) of polyethylene glycol having a molecular weight of 1450 in 17.4 parts (0.164 mole) of diethylene glycol with stirring. The solution is cooled to below 60° C. and to it is added a solution of delta gluconolactone prepared by dissolving 11.6 parts (0.065 mole) of delta gluconolactone in 46.4 parts of dimethyl sulfoxide. Eighty and eight tenths parts (0.316 mole) of methylene bis cyclohexyl-4,4'-isocyanate (a product identified as HYLENE W sold by E. I. DuPont de Nemours & Co., Wilmington, Del.) and 0.4 parts of diethanol amine are added to the mixture with stirring. One half part by weight of an organic tin catalyst solution; dibutyl tin dilaurate (a product identified as $T_{12}$ manufactured by Metal and Thermite Company of Rahway, N.J.) is added to the reaction mixture with stirring at a temperature below 45° C. to avoid undue temperature rise caused by the heat of reaction. After stirring for 20 minutes, the temperature increases to 80° C. The reaction mixture is then transferred to a tray and placed in an oven at 90° C. for 1 hour to complete the reaction. This polymer is amphoteric and, in the wet state, is soft, compliant and flexible.

What is claimed is:

1. A hydrophilic polyurethane polymer comprising the reaction product of:
    (A) one or more diols having an equivalent weight in the range of from about 100 to about 3,000, selected from the group consisting of:
        (a) diethylene glycol,
        (b) long chain polyoxyalkylene diols,
        (c) linear polyester diols derived from the condensation of one or more diols with one or more dibasic acids, and
        (d) the reaction product of one or more alkylene diols with a difunctional linear polyester derived from the condensation of one or more diols with one or more dibasic acids;
    (B) a polyfunctional lactone having the formula

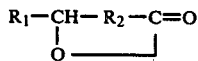

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
    (C) a urethane precursor selected from the group consisting of organic polyisocyanates and nitrile carbonates.

2. The polyurethane polymer of claim 1, wherein one of said diols is a difunctional linear polyester derived from the condensation of one or more diols with one or more dibasic acids.

3. The polyurethane polymer of claim 1, wherein one of said diols is the reaction product of a polyoxyalkylene diol with a difunctional linear polyester derived from the condensation of diethylene glycol with adipic acid.

4. A surgical suture comprising a hydrophilic polyurethane polymer obtained by reacting:
    (A) one or more diols having an equivalent weight in the range of from about 100 to about 3,000, selected from the group consisting of:
        (a) diethylene glycol,
        (b) long chain polyoxyalkylene diols,
        (c) linear polyester diols derived from the condensation of one or more diols with one or more dibasic acids, and
        (d) the reaction product of one or more alkylene diols with a difunctional linear polyester derived from the condensation of one or more diols with one or more dibasic acids;
    (B) a polyfunctional lactone having the formula

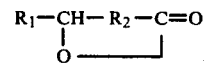

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
    (C) a urethane precursor selected from the group consisting of organic polyisocyanates and nitrile carbonates.

5. The suture of claim 4, wherein said hydrophilic polyurethane polymer is in the form of a monofilament.

6. The suture of claim 4, wherein said hydrophilic polyurethane polymer is in the form of a braided multifilament.

7. The suture of claim 4, having present in said hydrophilic polyurethane polymer a medicament.

8. The suture of claim 7 wherein said medicament is iodine.

9. A burn dressing comprising a hydrophilic polyurethane polymer obtained by reacting:
    (A) one or more diols having an equivalent weight in the range of from about 100 to about 3,000, selected from the group consisting of:
        (a) diethylene glycol,
        (b) long chain polyoxyalkylene diols,
        (c) linear polyester diols derived from the condensation of one or more diols with one or more dibasic acids, and
        (d) the reaction product of one or more alkylene diols with a difunctional linear polyester derived from the condensation of one or more diols with one or more dibasic acids;
    (B) a polyfunctional lactone having the formula

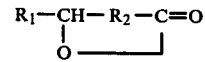

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
    (C) a urethane precursor selected from the group consisting of organic polyisocyanates and nitrile carbonates.

10. The burn dressing of claim 9 wherein said hydrophilic polyurethane polymer is in the form of a film.

11. The burn dressing of claim 9 wherein said hydrophilic polyurethane polymer is in powder form.

12. The burn dressing of claim 9 wherein said hydrophilic polyurethane polymer is in solution.

13. The burn dressing of claim 10 having present in said hydrophilic polyurethane polymer a medicament.

14. The burn dressing of claim 13 wherein said medicament is sulfadiazine.

15. The burn dressing of claim 11 wherein a medicament is distributed throughout the powder.

16. The burn dressing of claim 12 wherein a medicament is dissolved in said solution.

17. A surgical implant comprising a solid hydrophilic polyurethane polymer obtained by reacting:
(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;
(B) a polyfunctional lactone having the formula

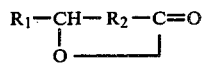

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates;
said polyurethane polymer having distributed throughout its masa a medicament.

18. The implant of claim 17 wherein said medicament is an anti-tubercular drug.

19. The implant of claim 17 wherein said medicament is a drug protagonist.

20. The implant of claim 17 wherein said medicament is a hormone.

21. The implant of claim 17 wherein said medicament is a steroid.

22. The implant of claim 17 wherein said medicament is a vitamin.

23. An intrauterine device comprising a hydrophilic polyurethane polymer obtained by reacting:
(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;
(B) a polyfunctional lactone having the formula

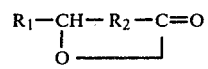

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates.

24. The intrauterine device of claim 23 in the shape of a ring.

25. The intrauterine device of claim 23 having distributed throughout said polyurethane polymer a contraceptive.

26. The intrauterine device of claim 25 wherein the contraceptive is lactic acid.

27. A canula, the walls of which are formed of a hydrophilic polyurethane polymer obtained by reacting:
(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diol with a difunctional linear polyester derived from the condensation of one or more diols with one or more dibasic acids;
(B) a polyfunctional lactone having the formula

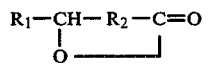

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates.

28. The canula of claim 27 wherein said polyurethane polymer has distributed throughout its mass a medicament.

29. The canula of claim 28 wherein said medicament is iodine.

30. A canula woven in textile fiber in the form of a tube having external and internal walls, at least one wall of which is coated with a film of a hydrophilic polyurethane polymer obtained by reacting:
(A) one or more diols having an equivalent weight in the range of from about 100 to about 3,000, selected from the group consisting of:
 (a) diethylene glycol,
 (b) long chain polyoxyalkylene diols, (c) linear polyester diols derived from the condensation of one or more diols with one or more dibasic acids, and (d) the reaction product of one or more alkylene diols with a difunctional linear polyester derived from the condensation of one or more diols with one or more dibasic acids;

(B) a polyfunctional lactone having the formula

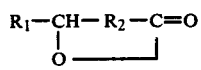

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

31. A vascular prosthesis comprising textile strands woven in the form of a tube; the intersticies between said woven strands being filled with a hydrophilic polyurethane polymer comprising the reaction product of:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

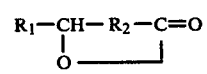

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

32. The vascular prosthesis of claim 31 wherein said polyurethane polymer has distributed throughout its mass a medicament.

33. The vascular prosthesis of claim 31 wherein said textile strands are polyethylene terphthalate strands.

34. The vascular prosthesis of claim 31 wherein said textile strands are collagen strands.

35. The vascular prosthesis of claim 32 wherein said medicament is heparin.

36. A method of controlling dehydration in humans and animals which comprises the oral administration of a hydrophilic polyurethane polymer obtained by reacting:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

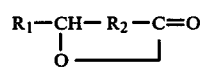

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

37. An oral delivery system comprising a pharmacologically active agent and a hydrophilic polyurethane polymer as a carrier vehicle therefor, said hydrophilic polyurethane polymer being the reaction product of:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

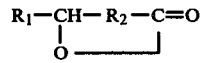

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

38. A solution effective in the repair of skin abrasions comprising a hydrophilic polyurethane polymer dissolved in a volatile non-toxic organic solvent, said polyurethane polymer being the reaction product of:

(A) one or more diols having an equivalent weight in the range of from about 100 to about 3,000, selected from the group consisting of:
(a) diethylene glycol, (b) long chain polyoxyalkylene diols,
(c) linear polyester diols derived from the condensation of one or more diols with one or more dibasic acids, and
(d) the reaction product of one or more alkylene diols with a difunctioal linear polyester derived from the condensation of one or more diols with one or more dibasic acids;

(B) a polyfunctional lactone having the formula

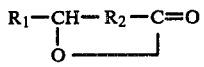

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

39. A cosmetic adapted for topical application comprising a solution of a non-toxic dye and a hydrophilic polyurethane polymer in a volatile non-toxic organic solvent, said polyurethane polymer being the reaction product of:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

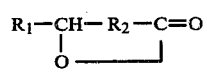

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

40. A surgical suture coated with a hydrophilic polyurethane polymer comprising the reaction product of:
(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

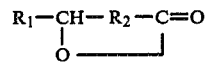

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

41. An eye bandage comprising a hydrophilic polyurethane polymer film obtained by reacting:
(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

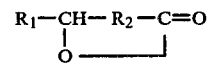

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

42. A battery separator plate formed of a hydrophilic polyurethane polymer comprising the reaction product of:
(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

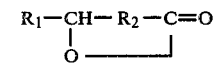

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

43. A hair spray composition comprising a solution in a volatile non-toxic solvent of a hydrophilic polyurethane polymer obtained by reacting:

(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;

(B) a polyfunctional lactone having the formula

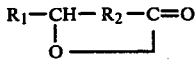

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

44. A gas permeable membrane formed of a hydrophilic polyurethane polymer comprising the reaction product of:

(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;

(B) a polyfunctional lactone having the formula

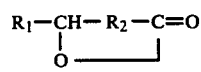

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

45. A depilatory liquid comprising a solution in a non-toxic solvent of a depilatory agent and a hydrophilic polyurethane polymer obtained by reacting:

(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;

(B) a polyfunctional lactone having the formula

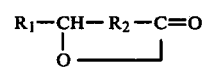

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

46. A solution of perfume and a hydrophilic polyurethane polymer in a non-toxic solvent said polyurethane polymer comprising the reaction product of:

(A) one or more diols having an equivalent weight in the range of from about 100 to about 3,000, selected from the group consisting of:
 (a) diethylene glycol,
 (b) long chain polyoxyalkylene diols,
 (c) linear polyester diols derived from the condensation of one or more diols with one or more dibasic acids, and
 (d) the reaction product of one or more alkylene diols with a difunctional linear polyester derived from the condensation of one or more diols with one or more dibasic acids;

(B) a polyfunctional lactone having the formula

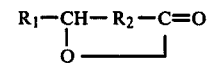

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

47. A corneal prosthesis comprising a solid transparent hydrophilic polyurethane polymer obtained by the reaction of:
(A) one or more diols having an equivalent weight in the range of from about 100 to about 3,000, selected from the group consisting of:
  (a) diethylene glycol,
  (b) long chain polyoxyalkylene diols,
  (c) linear polyester diols derived from the condensation of one or more diols with one or more dibasic acids, and
  (d) the reaction product of one or more alkylene diols with a difunctional linear polyester derived from the condensation of one or more diols with one or more dibasic acids;
(B) a polyfunctional lactone having the formula

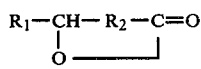

wherein $R_1$ is a monovalent radical selected from the group consisting of —H, —CHNH$_2$, —SO$_2$CH$_3$, —CHOHCOOH, and —(CHOH)$_n$C-H$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates,
said polyurethane polymer being in the shape of a lens and characterized by a refractive index in the range of from about 1.39 to about 1.55, dry.

48. A deodorant composition comprising a solution of a disinfectant, a perfume and a hydrophilic polyurethane polymer obtained by reacting:
(A) one or more diols having an equivalent weight in the range of from about 100 to about 3,000, selected from the group consisting of:
  (a) diethylene glycol,
  (b) long chain polyoxyalkylene diols,
  (c) linear polyester diols derived from the condensation of one or more diols with one or more dibasic acids, and
  (d) the reaction product of one or more alkylene diols with a difunctional linear polyester derived from the condensation of one or more diols with one or more dibasic acids;
(B) a polyfunctional lactone having the formula

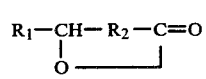

wherein $R_1$ is a monovalent radical selected from the group consisting of —H, —CHNH$_2$, —SO$_2$CH$_3$, —CHOHCOOH, and —(CHOH)$_n$C-H$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates.

49. A method of imparting moisture to a dry gas which comprises passing the gas through a tube formed of a hydrophilic polyurethane polymer obtained by reacting:
(A) one or more diols having an equivalent weight in the range of from about 100 to about 3,000, selected from the group consisting of:
  (a) diethylene glycol,
  (b) long chain polyoxyalkylene diols,
  (c) linear polyester diols derived from the condensation of one or more diols with one or more dibasic acids, and
  (d) the reaction product of one or more alkylene diols with a difunctional linear polyester derived from the condensation of one or more diols with one or more dibasic acids;
(B) a polyfunctional lactone having the formula

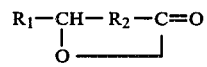

wherein $R_1$ is a monovalent radical selected from the group consisting of —H, —CHNH$_2$, —SO$_2$CH$_3$, —CHOHCOOH, and —(CHOH)$_n$C-H$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates.

50. An antifogging liquid containing in solution a hydrophilic polyurethane polymer comprising the reaction product of:
(A) one or more diols having an equivalent weight in the range of from about 100 to about 3,000, selected from the group consisting of:
  (a) diethylene glycol,
  (b) long chain polyoxyalkylene diols,
  (c) linear polyester diols derived from the condensation of one or more diols with one or more dibasic acids, and
  (d) the reaction product of one or more alkylene diols with a difunctional linear polyester derived from the condensation of one or morediols with one or more dibasic acids;
(B) a polyfunctional lactone having the formula

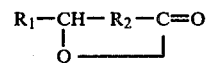

wherein $R_1$ is a monovalent radical selected from the group consisting of —H, —CHNH$_2$, —SO$_2$CH$_3$, —CHOHCOOH, and —(CHOH)$_n$C-H$_2$OH; n being an integer from 0 to 5; and $R_2$ is a divalent radical —(CHOH)$_m$—; m being an integer from 2 to 10; and ethers derived from said lactones; and
(C) a urethane precursor selected from the group consisting of organic polyisocyanates and nitrile carbonates.

51. A surgical drape comprising a fabric coated on at least one side with a hydrophilic polyurethane polymer obtained by reacting:
(A) one or more diols having an equivalent weight in the range of from about 100 to about 3,000, selected from the group consisting of:
  (a) diethylene glycol, (b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

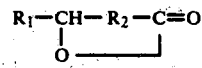

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (c) a urethane precursor selected from the group consisting of organic polyisocyanates and nitrile carbonates.

52. A dialysis membrane formed of a hydrophilic polyurethane polymer comprising the reaction product of:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

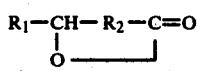

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic poyisocyanates and nitrile carbonates.

53. In a blood oxygenator the improvement which comprises a carbon dioxide - oxygen exchange membrane formed of a hydrophilic polyurethane polymer comprising the reaction product of:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

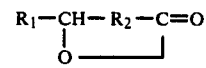

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

54. An amphoteric hydrophilic polyurethane polymer comprising the reaction product of:

(A) one or more diols having an equivalent weight in the range of from about 100 to about 3,000, selected from the group consisting of:
(a) diethylene glycol,
(b) long chain polyoxyalkylene diols,
(c) difunctional linear polyesters derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

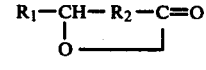

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones;

(C) a urethane precursor selected from the group consisting of organic polyisocyanates and nitrile carbonates; and (D) a dialkanol tertiary amine.

55. An esophageal prosthesis constructed of a fabric tube reinforced with a spirally wound polypropylene monofilament and coated on at least one side with a hydrophilic polyurethane polymer obtained by reacting:

(A) one or more diols having an equivalent weight in the range of from about 100 to about 3,000, selected from the group consisting of:
(a) diethylene glycol,
(b) long chain polyoxyalkylene diols,
(c) linear polyester diols derived from the condensation of one or more diols with one or more dibasic acids, and
(d) the reaction product of one or more alkylene diols with a difunctional linear polyester derived from the condensation of one or more diols with one or more dibasic acids;

(B) a polyfunctional lactone having the formula

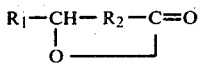

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

56. A contact lens comprising a molded hydrophilic polyurethane polymer obtained by reacting:
  (A) one or more diols having an equivalent weight in the range of from about 100 to about 3,000, selected from the group consisting of:
    (a) diethylene glycol,
    (b) long chain polyoxyalkylene diols,
    (c) linear polyester diols derived from the condensation of one or more diols with one or more dibasic acids, and
    (d) the reaction product of one or more alkylene diols with a difunctional linear polyester derived from the condensation of one or more diols with one or more dibasic acids;
  (B) a polyfunctional lactone having the formula

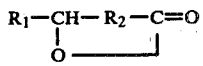

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

57. The polyurethane polymer of claim 1 characterized by a flow point below 275° C.

58. The polyurethane polymer of claim 1 characterized by the presence of lactone groups and hydroxyl groups in the polymer backbone.

59. The polyurethane polymer of claim 1 characterized by the presence of carboxyl groups and hydroxyl groups in the polymer backbone.

60. The polyurethane polymer of claim 1 which has been molded to form a desired shape.

61. A coated device consisting of a substrate coated with a hydrophilic polyurethane polymer comprising the reaction product of:
  (A) one or more diols having an equivalent weight in the range of from about 100 to about 3,000, selected from the group consisting of:
    (a) diethylene glycol,
    (b) long chain polyoxyalkylene diols,
    (c) linear polyester diols derived from the condensation of one or more diols with one or more dibasic acids, and
    (d) the reaction product of one or more alkylene diols with a difunctional linear polyester derived from the condensation of one or more diols with one or more dibasic acids;
  (B) a polyfunctional lactone having the formula

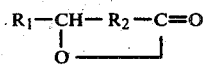

wherein $R_1$ is a monovalent radical selected from the group consisting of —H, —CHNH$_2$, —SO$_2$CH$_3$, —CHOHCOOH, and —(CHOH)$_n$CH$_2$OH; n being an integer from 0 to 5; and $R_2$ is a divalent radical —(CHOH)$_m$—; m being an integer from 2 to 10; and ethers derived from said lactones; and (C) a urethane precursor selected from the group consisting of organic polyisocyanates and nitrile carbonates.

62. The coated device of claim 61 wherein the substrate is a catheter.

63. The burn dressing of claim 9 wherein said hydrophilic polyurethane polymer is obtained by reacting:
  (A) one or more diols having an equivalent weight in the range of from about 100 to about 3,000, selected from the group consisting of:
    (a) diethylene glycol, and
    (b) long chain polyoxyalkylene diols;
  (B) a polyfunctional lactone having the formula

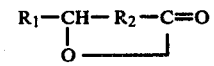

wherein $R_1$ is a monovalent radical selected from the group consisting of —H, —CHNH$_2$, —SO$_2$CH$_3$, —CHOHCOOH, and —(CHOH)$_n$CH$_2$OH; n being an interger from 0 to 5; and R is a divalent radical —(CHOH)$_m$—; m being an interger from 2 to 10; and ethers derived from said lactones; and (C) a urethane precursor selected from the group consisting of organic polyisocyanates and nitrile carbonates.

64. The burn dressing of claim 63 wherein said polyfunctional lactone is delta gluconolactone.

65. The burn dressing of claim 64 wherein said urethane precursor is methylene bis cyclohexyl 4,4'-isocyanate.

66. A composition useful in the treatment of burns comprising from about 1 to about 80 parts by weight of polyvinyl-pyrolidone-iodide and from about 20 to about 99 parts by weight of a polyether polyurethane resin having free hydroxyl and carboxylate groups in the polymer backbone.

67. A burn dressing comprising a film of a polyurethane polyether resin having carboxylate groups and hydroxyl groups in the polymer backbone.

68. A burn dressing comprising a polyurethane polyether resin having carboxylate groups and hydroxyl groups in the polymer backbone, said polyurethane polyether resin being in the form of a finely divided powder.

69. A method of treating burns which comprises applying thereto from solution in a non-toxic solvent a polyurethane polyether resin having carboxylate groups and hydroxyl groups in the polymer backbone.

* * * * *

UNITED STATES PATENT AND TRADEMARK OFFICE
CERTIFICATE OF CORRECTION

PATENT NO. : 4,156,067

DATED : May 22, 1979

INVENTOR(S) : Francis E. Gould

It is certified that error appears in the above-identified patent and that said Letters Patent are hereby corrected as shown below:

Column 1, line 51, "$CHNH_2$," should read --$CH_2NH_2$,--

Column 13, line 34, "$CHNH_2$," should read --$CH_2NH_2$,--

Column 14, line 15, "$CHNH_2$," should read --$CH_2NH_2$,--

Column 14, line 54, "$CHNH_2$," should read --$CH_2NH_2$,--

Column 15, line 31, "$CHNH_2$," should read --$CH_2NH_2$,--

Column 16, line 6, "$CHNH_2$," should read --$CH_2NH_2$,--

Column 16, line 45, "$CHNH_2$," should read --$CH_2NH_2$,--

Column 17, line 15, "$CHNH_2$," should read --$CH_2NH_2$,--

Column 17, line 47, "$CHNH_2$," should read --$CH_2NH_2$,--

Column 18, line 20, "$CHNH_2$," should read --$CH_2NH_2$,--

Column 18, line 52, "$CHNH_2$," should read --$CH_2NH_2$,--

Column 19, line 16, "$CHNH_2$," should read --$CH_2NH_2$,--

Column 19, line 48, "$CHNH_2$," should read --$CH_2NH_2$,--

Column 20, line 9, "$CHNH_2$," should read --$CH_2NH_2$,--

Column 20, line 39, "$CHNH_2$," should read --$CH_2NH_2$,--

Column 21, line 2, "$CHNH_2$," should read --$CH_2NH_2$,--

UNITED STATES PATENT AND TRADEMARK OFFICE
CERTIFICATE OF CORRECTION

PATENT NO. : 4,156,067

DATED : May 22, 1979

INVENTOR(S) : Francis E. Gould

It is certified that error appears in the above-identified patent and that said Letters Patent are hereby corrected as shown below:

Column 21, line 33, "$CHNH_2$," should read --$CH_2NH_2$,--

Column 21, line 65, "$CHNH_2$," should read --$CH_2NH_2$,--

Column 22, line 28, "$CHNH_2$," should read --$CH_2NH_2$,--

Column 22, line 60, "$CHNH_2$," should read --$CH_2NH_2$,--

Column 23, line 23, "$CHNH_2$," should read --$CH_2NH_2$,--

Column 23, line 58, "$CHNH_2$," should read --$CH_2NH_2$,--

Column 24, line 22, "$CHNH_2$," should read --$CH_2NH_2$,--

Column 24, line 53, "$CHNH_2$," should read --$CH_2NH_2$,--

Column 25, line 16, "$CHNH_2$," should read --$CH_2NH_2$,--

Column 25, line 46, "$CHNH_2$," should read --$CH_2NH_2$,--

Column 26, line 10, "$CHNH_2$," should read --$CH_2NH_2$,--

Column 26, line 41, "$CHNH_2$," should read --$CH_2NH_2$,--

Column 27, line 6, "$CHNH_2$," should read --$CH_2NH_2$,--

Column 27, line 36, "$CHNH_2$," should read --$CH_2NH_2$,--

UNITED STATES PATENT AND TRADEMARK OFFICE
CERTIFICATE OF CORRECTION

PATENT NO. : 4,156,067

DATED : May 22, 1979

INVENTOR(S) : Francis E. Gould

It is certified that error appears in the above-identified patent and that said Letters Patent are hereby corrected as shown below:

Column 28, line 9, "$CHNH_2$," should read --$CH_2NH_2$,--

Column 28, line 34, "$CHNH_2$," should read --$CH_2NH_2$,--.

Signed and Sealed this

Twenty-ninth Day of January 1980

[SEAL]

Attest:

SIDNEY A. DIAMOND

Attesting Officer

Commissioner of Patents and Trademarks